(12) United States Patent
Uchida et al.

(10) Patent No.: US 8,809,794 B2
(45) Date of Patent: Aug. 19, 2014

(54) RADIATION DETECTOR

(75) Inventors: Hiroshi Uchida, Hamamatsu (JP);
Takaji Yamashita, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/983,167

(22) PCT Filed: Jan. 13, 2012

(86) PCT No.: PCT/JP2012/050609
§ 371 (c)(1),
(2), (4) Date: Aug. 1, 2013

(87) PCT Pub. No.: WO2012/105292
PCT Pub. Date: Aug. 9, 2012

(65) Prior Publication Data
US 2013/0299710 A1    Nov. 14, 2013

(30) Foreign Application Priority Data
Feb. 2, 2011  (JP) ................. 2011-020942

(51) Int. Cl.
*G01T 1/20* (2006.01)
(52) U.S. Cl.
USPC ...... 250/366; 250/370.11; 250/394; 250/368; 250/361 R; 250/367
(58) Field of Classification Search
CPC ....... G01T 1/1642; G01T 1/1644; G01T 1/20; G01T 1/2002; G01T 1/2018
USPC ......... 250/366, 370.11, 394, 368, 361 R, 367
See application file for complete search history.

(56) References Cited

U.S. PATENT DOCUMENTS 3,825,758 A * 7/1974 Miraldi ..................... 250/366
4,823,016 A * 4/1989 Yamashita et al. ....... 250/363.03
(Continued)

FOREIGN PATENT DOCUMENTS

| JP | S63-075587 | 4/1988 |
| JP | H5-018390 | 3/1993 |

(Continued)

OTHER PUBLICATIONS

Nan Zhang, et al., "A Prototype Modular Detector Design for High Resolution Position Emission Mammography Imaging", IEEE Transactions on Nuclear Science, vol. 50, No. 5, Oct. 2003, p. 1624-p. 1629.

(Continued)

*Primary Examiner* — David Porta
*Assistant Examiner* — Djura Malevic
(74) *Attorney, Agent, or Firm* — Drinker Biddle & Reath LLP

(57) ABSTRACT

A radiation detector comprises a scintillator 2A having a first end face 11, a second end face 13 disposed on a side opposite from the first end face 11, and a plurality of light-scattering surfaces 21 formed with an interval therebetween along a first direction P from the first end face 11 side to the second end face 13 side; a first photodetector 12 optically coupled to the first end face 11; and a second photodetector 14 optically coupled to the second end face 13. The light-scattering surfaces 21 are formed so as to intersect the first direction P. The light-scattering surfaces 21 include modified regions 21R formed by irradiating the inside of the scintillator 2A with laser light.

9 Claims, 14 Drawing Sheets

(56) References Cited

U.S. PATENT DOCUMENTS

| | | | |
|---|---|---|---|
| 4,870,280 A * | 9/1989 | Yamashita et al. | 250/368 |
| 5,118,934 A * | 6/1992 | Hailey et al. | 250/366 |
| 5,132,539 A * | 7/1992 | Kwasnick et al. | 250/361 R |
| 6,087,663 A * | 7/2000 | Moisan et al. | 250/367 |
| 7,547,887 B2 * | 6/2009 | Ramsden et al. | 250/361 R |
| 8,519,349 B2 * | 8/2013 | Proctor et al. | 250/370.11 |
| 2004/0238751 A1 * | 12/2004 | Penn | 250/390.01 |
| 2005/0006589 A1 * | 1/2005 | Joung et al. | 250/370.09 |
| 2005/0253073 A1 * | 11/2005 | Joram et al. | 250/363.03 |
| 2007/0057194 A1 * | 3/2007 | Ryan et al. | 250/390.11 |
| 2007/0102641 A1 * | 5/2007 | Schmand et al. | 250/363.03 |
| 2008/0067390 A1 * | 3/2008 | Ramsden et al. | 250/361 R |
| 2009/0026375 A1 * | 1/2009 | Doshi | 250/366 |
| 2009/0236533 A1 * | 9/2009 | Ramsden et al. | 250/370.11 |
| 2009/0250620 A1 * | 10/2009 | Ryan et al. | 250/370.09 |
| 2011/0079726 A1 * | 4/2011 | Kusner et al. | 250/369 |
| 2011/0192979 A1 * | 8/2011 | Cahill | 250/362 |
| 2011/0263965 A1 * | 10/2011 | Kang et al. | 600/411 |
| 2012/0235047 A1 * | 9/2012 | Lewellen et al. | 250/366 |

FOREIGN PATENT DOCUMENTS

| | | |
|---|---|---|
| JP | H6-331748 | 12/1994 |
| JP | 2007-525652 | 9/2007 |
| JP | 2009-031132 | 2/2009 |
| JP | 2009-270971 | 11/2009 |
| JP | 2010-139375 | 6/2010 |
| JP | 2010-139383 | 6/2010 |

OTHER PUBLICATIONS

H. Murayama, et al., "Depth Encoding Multicrystal Detectors for PET", IEEE Transactions on Nuclear Science, vol. 45, No. 3, Jun. 1998, p. 1152-p. 1157.

Mikiko Ito, et al., "Design and simulation of a novel method for determining depth-of-interaction in a PET scintillation crystal array using a single-ended readout by a multi-anode PMT", IOP Publishing, Physics in Medicine and Biology, 55, Jun. 15, 2010, p. 3827-p. 3841.

P.A. Dokhale, et al., "Performance measurements of a depth-encoding PET detector module based on position-sensitive avalanche photodiode read-out", Institute of Physics Publishing, Physics in Medicine and Biology, 49, 2004, p. 4293-p. 4304.

K. Shimizu et al,, Development of 3-D Detector System for Positron CT', IEEE Transaction on Nuclear Science, vol. 35, No. 1, Feb. 1988, p. 717-p. 720.

J. Seidel, et al., "Depth Identification Accuracy of a Three Layer Phoswich PET Detector Module", IEEE Transactions on Nuclear Science, vol. 46, No. 3, Jun. 1999, p. 485-p. 490.

Shigeharu Kobayashi, et al., "Timing Characteristics of the Inorganic Scintillators Coupled with SiPMs for the PET Application", IEEE Nuclear Science Symposium Conference Record, 2008, p. 3909-p. 3913.

* cited by examiner (a)

(b)

(a)

(b)

RADIATION DETECTOR

TECHNICAL FIELD

The present invention relates to a radiation detector.

BACKGROUND ART

Patent Literatures 1 to 3 disclose radiation detectors which can be manufactured easily while being able to achieve high position resolution. The radiation detector described in Patent Literature 1 comprises a scintillator including a plurality of modified regions and a plurality of photodetectors optically coupled to a surface of the scintillator. The plurality of modified regions are formed by irradiating the inside of a crystal mass to become the scintillator with laser light. The modified regions have a refractive index different from that of their surroundings and are dispersed three-dimensionally within the scintillator.

The radiation detector described in Patent Literature 2 comprises a scintillator equipped with a crystal mass adapted to generate scintillation light in response to a radiation incident thereon and a plurality of photodetectors or position-sensitive photodetector optically coupled to an end face of the crystal mass. A plurality of modified regions are formed within the crystal mass. The plurality of modified regions, each having an elongated form with a predetermined longitudinal direction, are arranged with an interval therebetween in two-dimensional directions intersecting the predetermined longitudinal direction of the crystal mass.

The radiation detector described in Patent Literature 3 comprises a scintillator equipped with a crystalline crystal mass adapted to generate scintillation light in response to a radiation incident thereon and photodetectors optically coupled to surfaces of the crystal mass. The scintillator has a plurality of scattering surfaces therewithin. Each scattering surfaces is formed by irradiating the inside of the crystal mass with laser light and comprises two or more cracks intersecting each other while respectively extending along two or more surface directions parallel to a given axis within the crystal mass.

Patent Literature 4 discloses a method for fabricating a detector or light guide using laser technology. The method described in Patent Literature 4 uses laser technology to create micro-voids within a target media, thereby optically segmenting the media.

Patent Literature 5 discloses a radiation detector which can improve position resolution. As illustrated in FIG. 12, a radiation detector 100 described in Patent Literature 5 comprises a pillar scintillator 101 having a plurality of stripe-shaped roughly polished parts 102 on a side face and photodetectors 103, 104 optically coupled to both ends of the pillar scintillator 101.

CITATION LIST

Patent Literature

Patent Literature 1: Japanese Patent Application Laid-Open No. 2009-270971
Patent Literature 2: Japanese Patent Application Laid-Open No. 2010-139375
Patent Literature 3: Japanese Patent Application Laid-Open No. 2010-139383
Patent Literature 4: Japanese Translated International Application Laid-Open No. 2007-525652
Patent Literature 5: Japanese Patent Publication No. 5-18390

Non Patent Literature

Non Patent Literature 1: Timing Characteristics of the Inorganic Scintillators Coupled with SiPMs for the PET Application, 2008 IEEE Nuclear Science Symposium Conference Record, pp 3909-3913, 2008

SUMMARY OF INVENTION

Technical Problem

One of methods for improving the detection accuracy of radiation detectors used for PET (Positron Emission Tomography) devices is one employing information concerning a position where a radiation is detected within a scintillator (hereinafter referred to as "detection position information"). An example of methods for obtaining the detection position information is one optically separating a scintillator into a plurality of regions and specifying a region where scintillation light is generated.

A specific example is a method stacking different kinds of scintillators whose scintillator light decay times differ from each other on top of another on a PMT (Photomultiplier Tube). However, the kinds of scintillators whose scintillator light decay times differ from each other are limited in number, which makes it hard to stack four or more kinds of scintillators on top of another, for example. Hence, there is a limit to improvement in positional accuracy.

Another method is one stacking a plurality of scintillators on a PMT with an offset along an in-plane direction of a scintillator end face. This method produces grooves on an end face of one scintillator crystal with a diamond cutter, so as to form a plurality of scintillator cells, and provides an end face opposite to the former end face with an offset, so as to form a plurality of scintillator cells by a similar method. However, such a scintillator is complicated in structure. Hence, it takes time and expense to manufacture the scintillator.

There is also a method arranging gaps, various optical couplers, optical separators having predetermined refractive indexes, and the like between a plurality of scintillator cells so as to be able to clearly specify which scintillator cell in the plurality of scintillator cells emitted light. However, a step of assembling a plurality of scintillator cells is necessary for making such a scintillator cell. Hence, it takes time and expense to manufacture the scintillator.

As illustrated in FIG. 13, there is a method arranging comb-shaped reflectors 112 between scintillator cells 111 in order to separate the scintillator cells 111 optically from each other. In thus constructed scintillator 110, scintillation light occurring on the upper side of the scintillator cells 111 is scattered into the X direction. On the other hand, scintillation light occurring on the lower side of the scintillator cells 111 is scattered into the Y direction. Thus, according to the diffusing direction and range of scintillation light, positions at which the scintillation light is generated can be calculated. However, manufacturing such a scintillator necessitates steps of making the comb-shaped reflectors 112 and assembling the reflectors 112 and scintillator cells 111. Hence, it takes time and expense to manufacture the scintillator 110.

Another example is a method calculating detection position information according to the ratio between a signal amplitude issued from a photodetector disposed at one end of the scintillator and a signal amplitude issued from a photodetector disposed at the other end of the scintillator. Such a method is advantageous over the method separating a scintillator into a plurality of regions in that the detection position information can be detected as spatially continuous information. Since the inside of a scintillator cell is substantially optically homogenous, however, the ratio of optical outputs at both ends varies little depending on the light emission position within the scintillator cell, whereby the accuracy in detection position tends to be low.

As illustrated in FIG. 14, in a radiation detector 120 comprising a scintillator 121 and photodetectors 122, 124 disposed at both end parts of the scintillator 121, there is a method arranging grooves 123 on a surface of the scintillator 121 at equally-spaced intervals longitudinally thereof (see, for example, Non Patent Literature 1). This enhances the difference between signal amounts obtained by the photodetectors at both ends, thereby improving the accuracy in detection position. However, processing for forming the grooves 123 is necessary for making thus constructed scintillator 121. Hence, it takes time and expense to manufacture the scintillator 121.

In view of the problems mentioned above, it is an object of the present invention to provide a radiation detector which can achieve a favorable position detection characteristic while being easy to manufacture.

Solution to Problem

The radiation detector in accordance with one aspect of the present invention is a radiation detector for detecting a radiation, the radiation detector comprising a scintillator having a first end face, a second end face disposed on a side opposite from the first end face, and a plurality of light-scattering surfaces formed with an interval therebetween along a first direction from the first end face side to the second end face side; a first photodetector optically coupled to the first end face; and a second photodetector optically coupled to the second end face; wherein the light-scattering surfaces are formed so as to intersect the first direction; and wherein the light-scattering surfaces include one or a plurality of modified regions formed by irradiating the inside of the scintillator with laser light.

In this radiation detector, the first and second photodetectors are optically coupled to the first and second end faces of the scintillator, respectively. Such a structure allows the first and second photodetectors to detect scintillation light generated within the scintillator, whereby the ratio of thus detected optical outputs can be calculated. The ratio of the optical outputs has a predetermined difference which is easily discriminable for each light emission region. Therefore, a light emission region where scintillation light is generated can accurately be specified according to the ratio of optical outputs, whereby the radiation detector can achieve a favorable position detection characteristic.

In the radiation detector, the light-scattering surfaces may be formed by irradiating the inside of the scintillator with the laser light. Using a processing method with laser light for forming the light-scattering surfaces can automate the step of forming the light-scattering surfaces. The processing method with laser light can be performed more simply than a method of polishing the surface of the scintillator or forming a groove thereon. Hence, the above-mentioned radiation detector can be manufactured easily.

In the radiation detector, the modified region of the radiation detector may be constituted by a plurality of modified spots overlapping each other. Such a structure can favorably form light-scattering surfaces having a modified region which scatters scintillation light.

The light-scattering surface of the radiation detector may be constructed by forming the modified region all over. Such a structure can enhance the difference between the optical output obtained when detecting scintillation light generated in a region closer to the photodetector and the optical output obtained when detecting scintillation light generated in a region farther from the photodetector. This makes it possible to more accurately calculate the ratio of the respective optical outputs detected by the first and second photodetectors, whereby the above-mentioned radiation detector can achieve a better position detection characteristic.

The light-scattering surface of the radiation detector may have a first area formed with the modified region and a second area not formed with the modified region, the second area being surrounded by the first area. Scintillation light occurring upon absorption of a radiation generates several hundreds to several thousands of photons depending on the energy absorbed, so that a part of the light, if any, affected by the scattering surface will influence the light reaching each end, whereby similar effects can be obtained. Such a structure can favorably form a plurality of light-scattering surfaces even when the scintillator is thick and thus includes a region which is so far from the laser entrance surface as to be hard to form the modified region. This also makes it unnecessary to form the modified region over the whole light-scattering surface, whereby the radiation detector can be manufactured easily.

The light-scattering surface of the radiation detector may have a plurality of third areas formed with the modified region and a plurality of fourth areas not formed with the modified region, the third and fourth areas being arranged in a checkerboard pattern. In the radiation detector, the first end face may have a quadrangular form, while the light-scattering surface may have a first modified region extending along one diagonal in the first end face and a second modified region extending along the other diagonal in the first end face. In the radiation detector, the light-scattering surface may have a plurality of modified regions extending in a second direction, and the plurality of modified regions are arranged with an interval therebetween along a direction substantially orthogonal to the second direction. In the radiation detector, the first end face may have a quadrangular form, while the light-scattering surface may have four modified regions, and the modified regions are arranged at each of four corners of the light-scattering surface. In the radiation detector, the light-scattering surface may have a modified region extending in a direction along a part or whole of an edge part of the light-scattering surface.

Such a structure sets the area of the modified region in the light-scattering surface to a predetermined value. As a consequence, the ratio at which the scintillation light is distributed to the first and second photodetectors can be set to a predetermined value. This allows the radiation detector to make the light reaching the photodetectors have a given quantity and thus can achieve a better position detection characteristic.

Advantageous Effects of Invention

The radiation detector in accordance with the present invention can achieve a favorable position detection characteristic while being easy to manufacture.

BRIEF DESCRIPTION OF DRAWINGS

FIG. 8(a) is a diagram illustrating the structure of a light-scattering surface of the radiation detector in accordance with Modified Example 2, while FIG. 8(b) is a diagram illustrating the structure of a light-scattering surface of the radiation detector in accordance with Modified Example 3;

FIG. 9(a) is a diagram illustrating the structure of a light-scattering surface of the radiation detector in accordance with Modified Example 4, while FIG. 9(b) is a diagram illustrating the structure of a light-scattering surface of the radiation detector in accordance with Modified Example 5;

DESCRIPTION OF EMBODIMENTS

In the following, embodiments of the radiation detector in accordance with the present invention will be explained in detail with reference to the accompanying drawings. In the explanation of the drawings, the same constituents will be referred to with the same signs while omitting their overlapping descriptions.

First Embodiment

Figure 1:
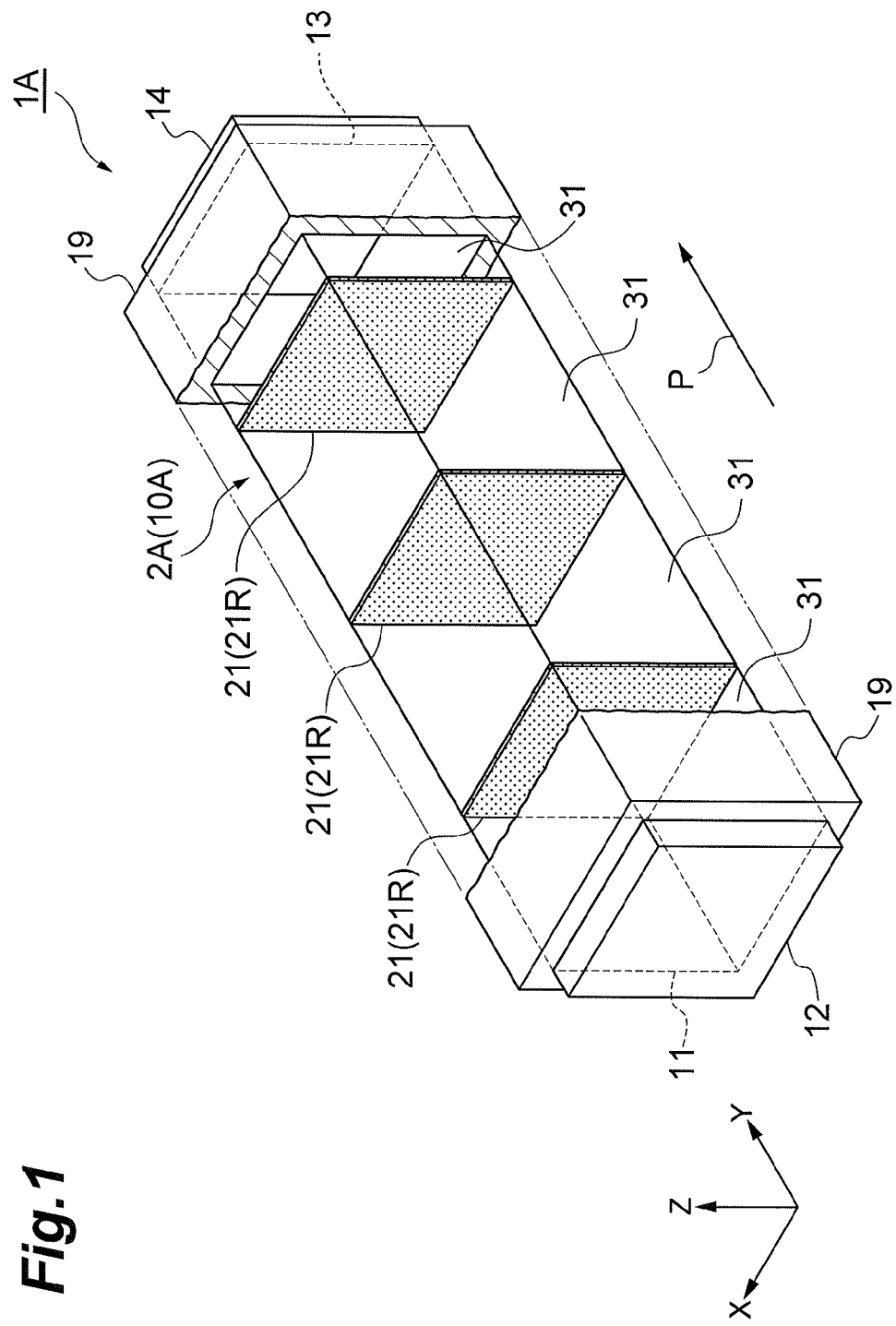
FIG. 1 is a perspective view illustrating the overview and inner structure of the radiation detector in accordance with a first embodiment.

FIG. 1 is a perspective view illustrating the overview and inner structure of a radiation detector 1A in accordance with the first embodiment. The radiation detector 1A in accordance with this embodiment comprises a scintillator 2A, first and second photodetectors 12, 14 respectively optically coupled to first and second end faces 11, 13 of the scintillator 2A, and a reflector 19.

The scintillator 2A is a member for providing the first and second photodetectors 12, 14 with scintillation light. The scintillator 2A is constituted by a crystal mass 10A adapted to generate scintillation light in response to a radiation such as a gamma ray incident thereon. The crystal mass 10A has a substantially rectangular parallelepiped outer form.

The scintillator 2A absorbs the radiation incident on the crystal mass 10A and generates scintillation light having an intensity corresponding to the energy of radiation. The crystal mass 10A is favorably constructed by any of crystals such as $Bi_4Ge_3O_{12}$ (BGO), Ce-doped $Lu_2SiO_5$ (LSO), $Lu_{2(1-X)}Y_{2X}SiO_5$ (LYSO), $Gd_2SiO_5$ (GSO), Pr-doped LuAG ($Lu_3Al_5O_{12}$), Ce-doped $LaBr_3$ ($LaBr_3$), Ce-doped $LaCl_3$ ($LaCl_3$), and Ce-doped $Lu_{0.7}Y_{0.3}AlO_3$ (LuYAP), for example.

As illustrated in FIG. 1, the scintillator 2A comprises a plurality of light-scattering surfaces 21 and a plurality of light emission regions 31. The plurality of light-scattering surfaces 21 separate the scintillator 2A into the plurality of light emission regions 31. The plurality of light-scattering surfaces 21 are formed with intervals therebetween along a first direction P from the first end face 11 to the second end face 13. The plurality of light-scattering surfaces 21 are formed such as to intersect the first direction P. Each of the light-scattering surfaces 21 has a two-dimensional form identical to that of the first or second end face 11, 12 of the scintillator 2A. The inside of the scintillator 2A illustrated in FIG. 1 is formed with three light-scattering surfaces 21, the number of which is not limited thereto. Four or more light-scattering surfaces 21 may also be formed.

Each light-scattering surface 21 is constructed by forming a modified region 21R all over. The modified region 21R is constituted by a plurality of modified spots which are formed so as to overlap each other and produce an optical scattering surface. Each modified spot has a void form, for example. The modified region 21R neither blocks nor absorbs the scintillation light, whereby a part of the scintillation light passes through the light-scattering surface 21 formed with the modified region 21R all over. The light-scattering surface 21 has such a property that the transmittance of scintillation light varies depending on the angle at which the scintillation light is incident thereon. The transmittance in the light-scattering surface 21 changes according to the incident angle of scintillation light. When scintillation light is perpendicularly incident on the light-scattering surface 21, for example, the incident scintillation light substantially passes therethrough. As the incident angle increases, on the other hand, the transmittance becomes lower than that in the perpendicular incidence.

The first and second photodetectors 12, 14 are favorably constructed by photomultipliers, avalanche photodiodes (APD: avalanche photodiode), or semiconductor photodetectors such as MPPC (Multi-Pixel Photon Counter), for example. The MPPC is a photon counting device constituted by pixels of a plurality of Geiger-mode APDs. The radiation detector 1A in accordance with this embodiment comprises the first and second photodetectors 12, 14. The first photodetector 12, which is one of the photodetectors, is attached onto the crystal mass 10A so as to oppose the first end face 11 of the crystal mass 10A. The second photodetector 14, which is the other photodetector, is attached onto the crystal mass 10A so as to oppose the second end face 13 of the crystal mass 10A. This optically couples the first and second photodetectors 12, 14 to the first and second end faces 11, 13 of the crystal mass 10A, respectively.

The reflector 19 is disposed such as to cover side faces extending between the first and second end faces 11, 13 in the scintillator 2A. The reflector 19 is favorably constituted by any of members such as Teflon (registered trademark) tape, barium sulfate, aluminum oxide, titanium oxide, ESR (Enhanced Specular Reflector) films, and polyester films, for example.

Figure 2:
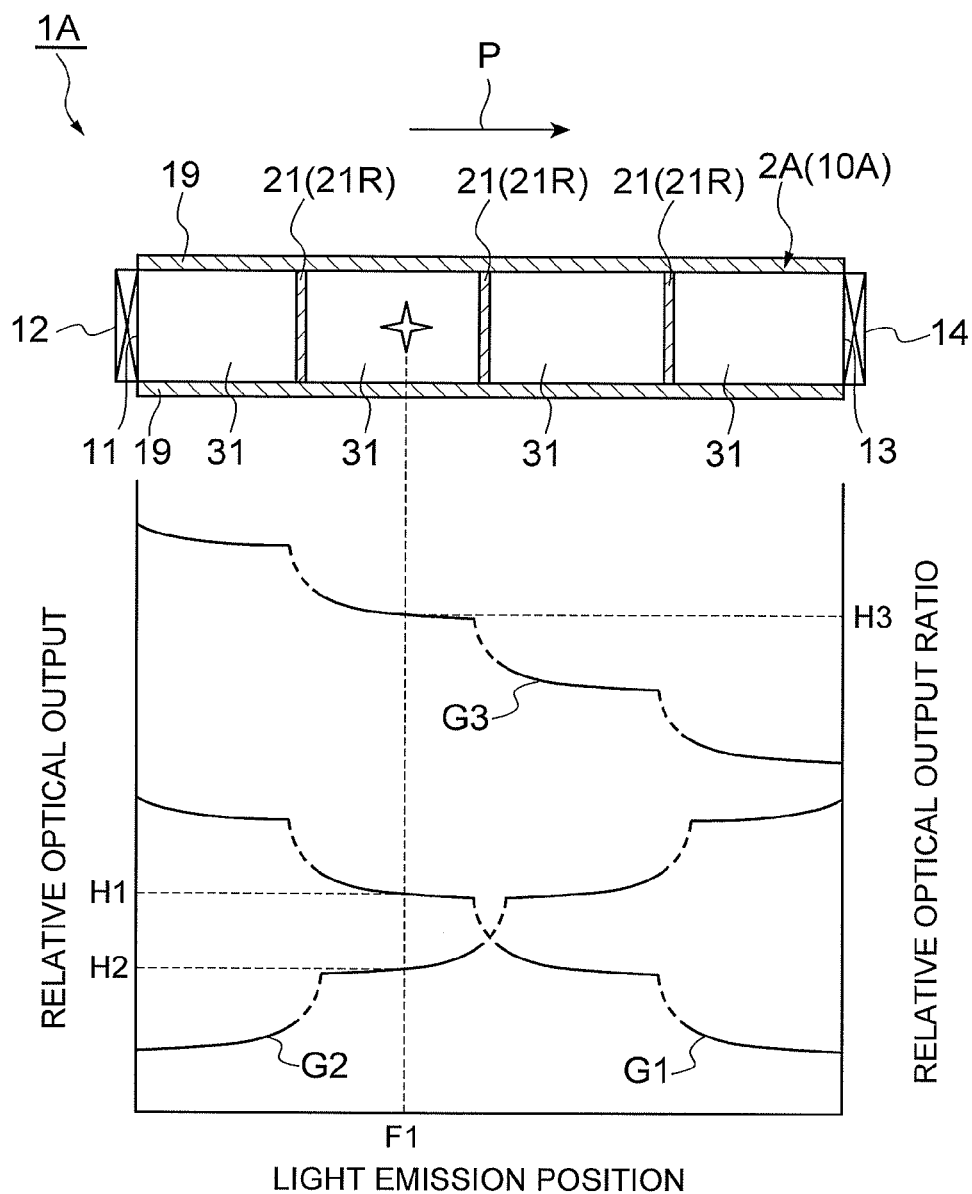
FIG. 2 is a diagram for explaining effects of the radiation detector in accordance with the first embodiment.

Operations and effects of the radiation detector 1A in accordance with this embodiment will now be explained with reference to FIG. 2. Graph G1 in FIG. 2 illustrates the relationship between the position at which the scintillation light is emitted in the scintillator 2A and the optical output issued from the first photodetector 12. Graph G2 illustrates the relationship between the position at which the scintillation light is emitted in the scintillator 2A and the optical output issued from the second photodetector 14. Graph G3 illustrates the relationship between the optical output ratio and the position at which the scintillation light is emitted. The optical output ratio is the ratio between the respective optical outputs issued from the first and second photodetectors 12, 14.

In the radiation detector 1A in accordance with this embodiment, the first photodetector 12 is optically coupled to the first end face 11 of the scintillator 2A. The second photodetector 14 is optically coupled to the second end face 13. Such a structure allows the first and second photodetectors 12, 14 to detect scintillation light generated within the scintillator 2A, whereby the ratio of the optical outputs issued from the first and second photodetectors 12, 14 can be calculated.

In the radiation detector 1A in accordance with this embodiment, the scintillator 2A has a plurality of light-scattering surfaces 21. The plurality of light-scattering surfaces 21 can stepwise attenuate the quantities of light reaching the first and second photodetectors 12, 14. When generated at a position F 1 in the scintillator 2A, for example, scintillation light passes through the light-scattering surface 21, so as to reach the first photodetector 12. The scintillation light partly scatters when passing through the light-scattering surface 21 and thus has a smaller quantity after passing through the light-scattering surface 21 than therebefore. Then, the first photodetector 12 issues an optical output H1. On the other hand, the second photodetector 14 issues an optical output H2.

A ratio H3 between the optical output H1 issued from the first photodetector 12 and the optical output H2 issued from the second photodetector 14 is calculated. As illustrated in Graph G3, the optical output ratio H3 has a predetermined difference which is easily discriminable for each light emission region 31. Hence, the light emission region 31 where scintillation light is generated can accurately be specified according to the optical output ratio H3, whereby the radiation detector 1A can achieve a favorable position detection characteristic.

The light-scattering surfaces 21 are formed by irradiating the inside of the scintillator 2A with laser light. Using a processing method with laser light for forming the light-scattering surfaces 21 can automate the step of forming the light-scattering surfaces 21. The processing method with laser light can be performed more simply than a method of polishing the surface of the scintillator or forming a groove thereon. Hence, the above-mentioned radiation detector 1A can be manufactured easily.

The modified region 21R is formed all over the light-scattering surface 21. Such a structure can enhance the difference between the optical output obtained when detecting scintillation light generated in a region closer to the first or second photodetector 12, 14 and the optical output obtained when detecting scintillation light generated in a region farther from the first or second photodetector 12, 14. This makes it possible to more accurately calculate the ratio of the respective optical outputs detected by the first and second photodetectors 12, 14, whereby the above-mentioned radiation detector 1A can achieve a better position detection characteristic.

Figure 3:
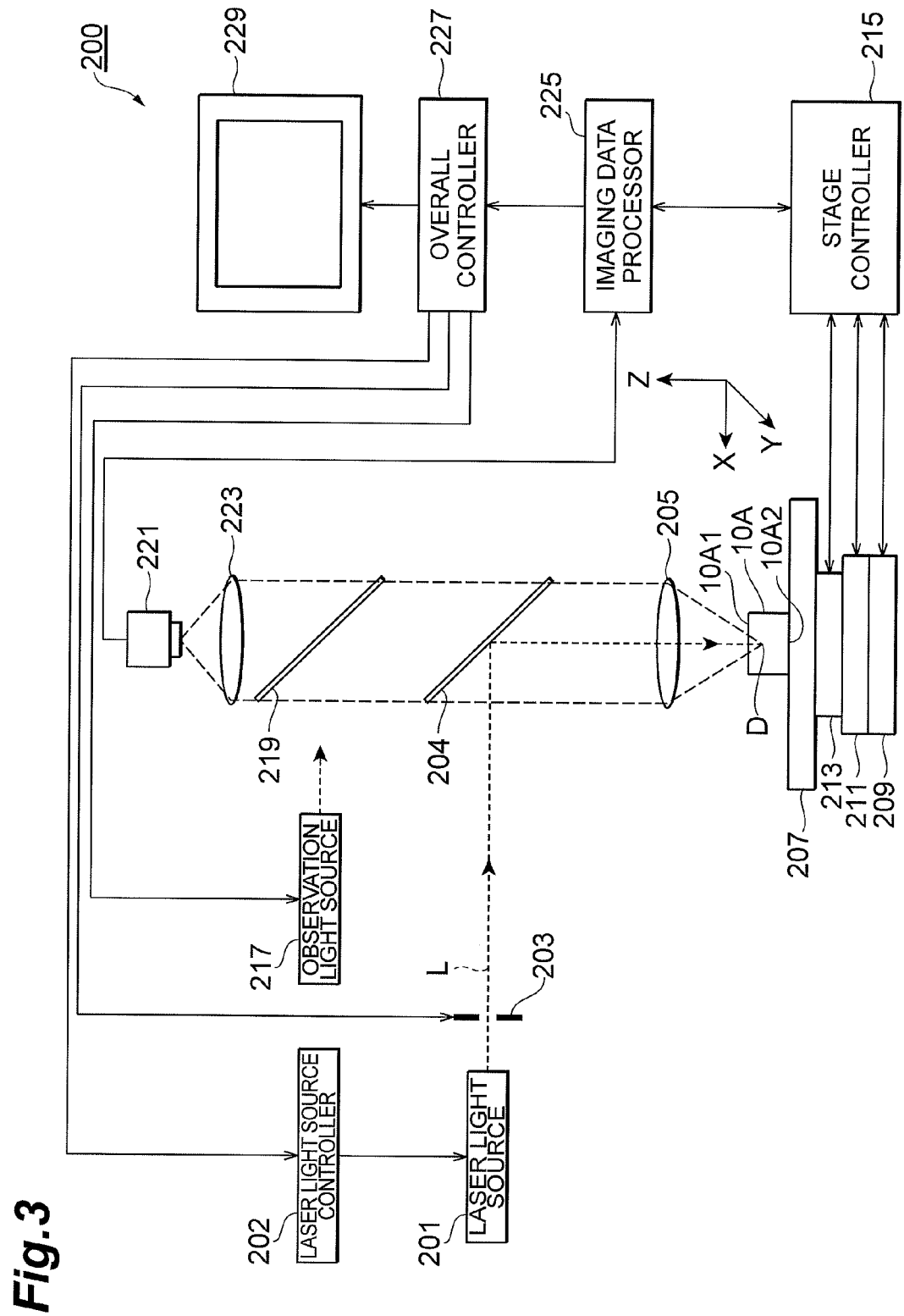
FIG. 3 is a diagram illustrating the structure of a laser processing device used in a process of manufacturing a scintillator.

The modified regions 21R are formed by a method which will be explained in the following. FIG. 3 is a diagram for explaining a process of manufacturing the scintillator 2A including a plurality of modified regions 21R and illustrates the structure of a laser processing device 200 used in this process.

The laser processing device 200 comprises a laser light source 201 for generating laser light L, a laser light source controller 202 for controlling the laser light source 201 in order to adjust the output, pulse width, and the like of the laser light L, a shutter 203 disposed on an optical path of the laser light L, a dichroic mirror 204 arranged so as to change the direction of the optical axis of the laser light L by 90° while having a function to reflect the laser light L, a condenser lens 205 for converging the laser light L reflected by the dichroic mirror 204, a mount table 207 for mounting the crystal mass 10A irradiated with the crystal mass 10A converged by the condenser lens 205, an X-axis stage 209 for moving the mount table 207 along an X axis, a Y-axis stage 211 for moving the mount table 207 along a Y axis orthogonal to the X axis, a Z-axis stage 213 for moving the mount table 207 along a Z axis orthogonal to the X and Y axes, and a stage controller 215 for controlling movements of the three stages 209, 211, 213.

The Z axis aligns with the focal depth of the laser light L incident on the crystal mass 10A. Hence, moving the Z-axis stage along the Z axis can position a converging point D of the laser light within the crystal mass 10A. The converging point D is shifted along the X and Y axes by moving the crystal mass 10A along the X and Y axes with the X- and Y-axis stages 209, 211, respectively.

The laser light source 201 is a Yb:KGW laser which generates ultrashort pulsed laser light. Other examples of lasers usable for the laser light source 201 include Yb:YAG, Nd:YAG, Nd:YVO$_4$, Nd:YLF, and titanium sapphire lasers. Though either pulsed or continuous-wave laser light may be used for processing the crystal mass 10A, the pulsed laser light is preferred.

Examples of the pulsed laser light include femtosecond pulsed laser light and picosecond pulsed laser light. The femtosecond and picosecond laser pulses have a rate of laser energy absorption higher than their rate of thermal diffusion, so that heat is less likely to affect the surroundings of parts to be processed, while a high electric field density can be obtained easily, whereby the modified regions 21R, such as refractive index changes which cause no cracks, can be formed favorably. For attaining an electric field density at a processing threshold or higher, nanosecond laser pulses require an irradiation energy which is several times as high as that of femtosecond or picosecond laser pulses, while their laser energy is likely to be stored as heat in materials to be processed, whereby further contrivances are necessary for forming the modified regions 21R such as refractive index changes.

The laser processing device 200 also comprises an observation light source 217 for generating a visible light beam for illuminating the crystal mass 10A mounted on the mount table 207 and a beam splitter 219 for visible light arranged on the same optical axis as with the dichroic mirror 204 and condenser lens 205. The dichroic mirror 204 is arranged between the beam splitter 219 and condenser lens 205. The beam splitter 219 is arranged so as to change the direction of the optical axis of the laser light L by 90° while having a function to reflect about a half of the visible light beam and pass the remaining half therethrough. About a half of the visible light beam generated from the observation light source 217 is reflected by the beam splitter 219, and thus reflected part of the visible light beam passes through the dichroic mirror 204 and condenser lens 205, so as to illuminate a part to be processed in the crystal mass 10A.

The laser processing device 200 further comprises a CCD camera 221 and an imaging lens 223 which are arranged on the same optical axis as with the beam splitter 219, dichroic mirror 204, and condenser lens 205. Reflected light of the visible light beam having illuminated the part to be processed passes through the condenser lens 205, dichroic mirror 204, and beam splitter 219, so as to form an image through the imaging lens 223, which is captured by the CCD camera 221, so as to become imaging data.

The laser processing device 200 also comprises an imaging data processor 225 for receiving the imaging data issued from the CCD camera 221, an overall controller 227 for controlling the laser processing device 200 as a whole, and a monitor 229. The imaging data processor 225 computes focus data for locating a focal point of the visible light generated in the observation light source 217 onto the crystal mass 10A according to the imaging data. The stage controller 215 controls the movement of the Z-axis stage 213 according to the focus data such that the focal point of the visible light coincides with the crystal mass 10A. Hence, the imaging data processor 225 functions as an autofocus unit. The imaging data processor 225 also computes image data for an enlarged image of the crystal mass 10A and the like according to the imaging data. This image data is sent to the overall controller 227, which performs various kinds of processing and feeds the processed data to the monitor 229. This allows the monitor 229 to display the enlarged image and the like.

The overall controller 227 receives the data from the stage controller 215, the image data from the imaging data processor 225, and the like and regulates the laser light source controller 202, shutter 203, observation light source 217, and stage controller 215 according to these data, so as to control the laser processing device 200 as a whole. Hence, the overall controller 227 functions as a computer unit.

Figure 4:
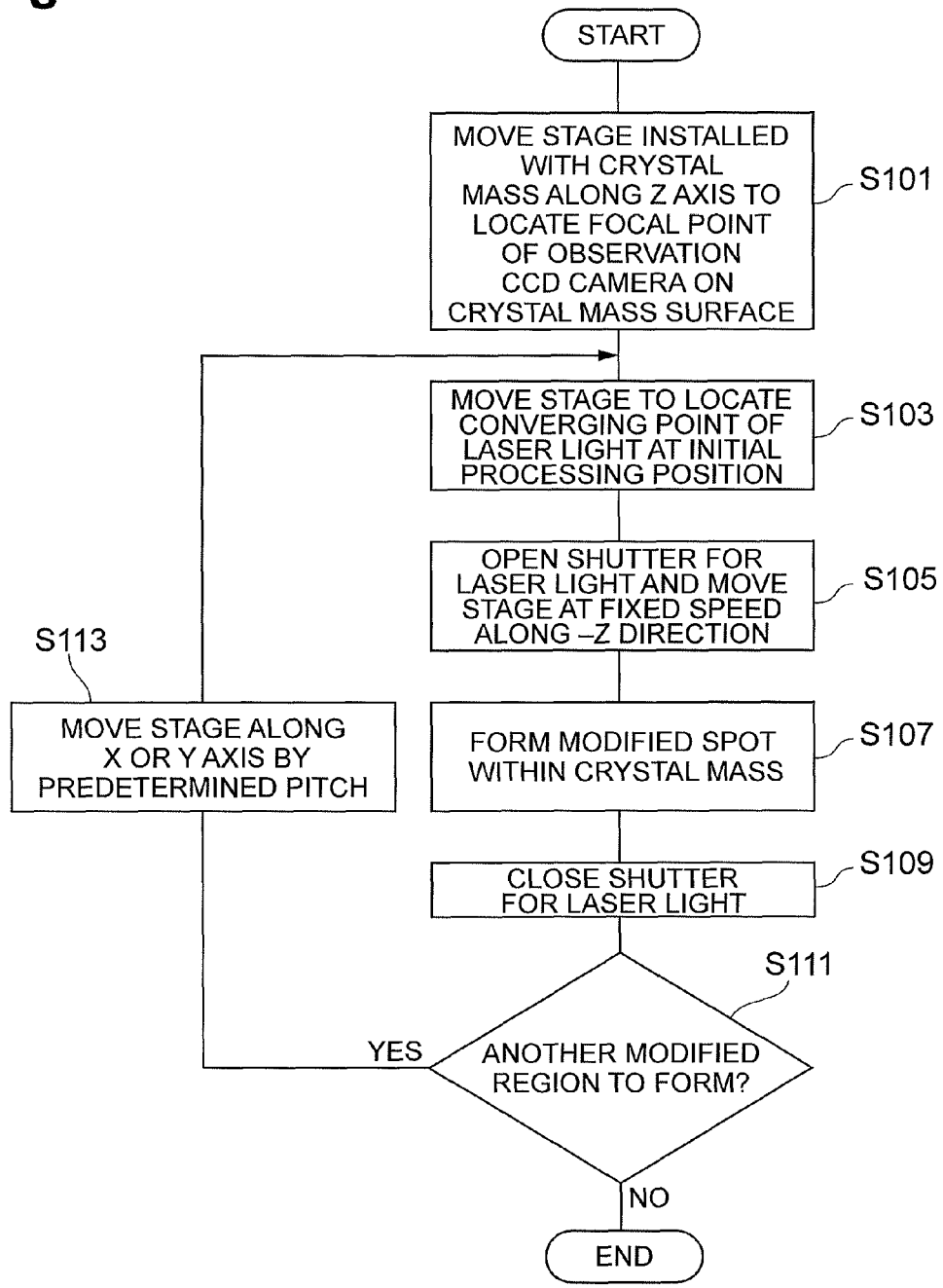
FIG. 4 is a flowchart illustrating a method of forming a light-scattering surface by using the laser processing device.

A method of manufacturing the scintillator 2A in accordance with this embodiment will now be explained. FIG. 4 is a flowchart illustrating a method of manufacturing the crystal mass 10A of the scintillator 2A by using the above-mentioned laser processing device 200.

First, the crystal mass 10A is mounted on the mount table 207 of the laser processing device 200. Subsequently, the crystal mass 10A is illuminated with visible light generated from the observation light source 217. A surface (e.g., an end face 10A1) of the illuminated crystal mass 10A is captured by the CCD camera 221. The imaging data captured by the CCD camera 221 is sent to the imaging data processor 225. According to the imaging data, the imaging data processor 225 computes such focus data as to locate the focal point of the visible light on the surface of the crystal mass 10A. The focus data is fed to the stage controller 215. The stage controller 215 moves the Z-axis stage 213 along the Z axis according to the focus data. As a consequence, the focal point of the visible light of the observation light source 217 is located on the surface of the crystal mass 10A (S101). The imaging data processor 225 computes enlarged image data of the surface of the crystal mass 10A according to the imaging data. The enlarged image data is sent to the monitor 229 through the overall controller 227, whereby the monitor 229 displays the enlarged image of the surface of the crystal mass 10A.

Next, the X-, Y-, and Z-axis stages 209, 211, 213 move the crystal mass 10A such that the converging point D of the laser light L for forming the modified regions 21R within the crystal mass 10A is located at an initial processing position for one modified region 21R on the surface or inside of the crystal mass 10A (S103). In this state, the shutter 203 is opened, so as to emit the laser light L, which modifies (amorphizes) a scintillator material at its converging part, thereby forming a modified spot within the crystal mass 10A. While forming such a modified spot, the Z-axis stage 213 moves the crystal mass 10A at a fixed speed along the Z axis (S105). This forms a row of modified spots having an elongated (stripe) form whose longitudinal direction aligns with the Z axis (S107). Here, the modified spots are preferably formed so as to overlap each other.

The modified spot is at least one of a region having a refractive index lower than that of its surroundings, a region adapted to scatter light, and a region constituting a diffractive lens, for example. Thereafter, the shutter 203 of the laser light L is closed (S109).

Next, when there is another modified spot to form (S111: Yes), the X-, Y-, and Z-axis stages 209, 211, 213 move the crystal mass 10A such that the converging point D of the laser light L is located at an initial processing position for this modified region 21R within the crystal mass 10A. For example, the crystal mass 10A is moved along the X or Y axis by a predetermined pitch with respect to the previously formed modified spot (S113). In this case, the previously formed row of modified spots and a newly formed row of modified spots preferably overlap each other.

Thereafter repeating the above-mentioned steps S103 to S113 can form a plurality of modified regions 21R constituted by modified spots. The plurality of modified regions 21R are preferably formed such as to be arranged regularly with intervals therebetween in a first direction P (along the Y axis) within the crystal mass 10A.

This process ends when all of the plurality of modified regions 21R are completely formed (S111: No).

Second Embodiment

Figure 5:
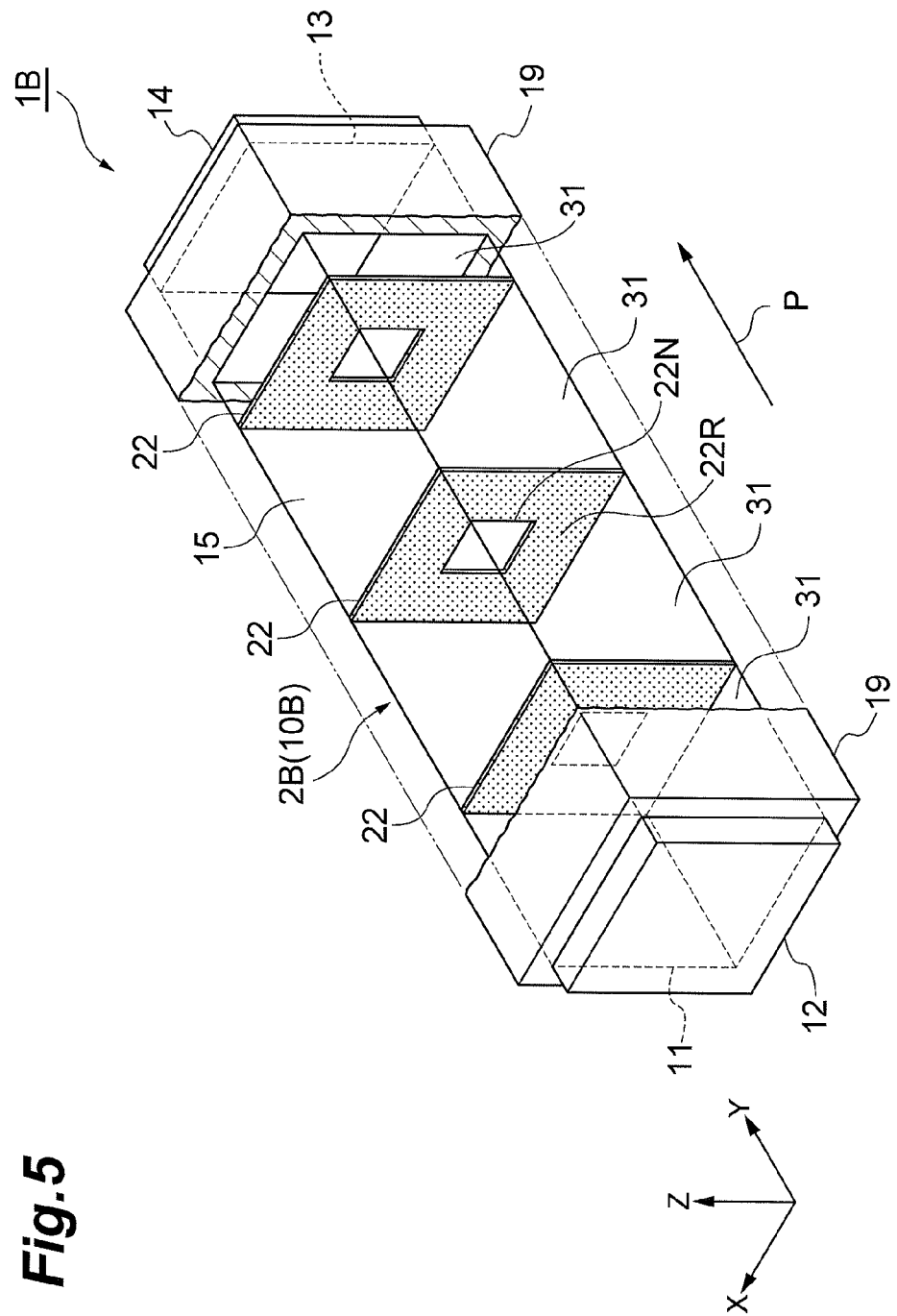
FIG. 5 is a perspective view illustrating the overview and inner structure of the radiation detector in accordance with a second embodiment.

FIG. 5 is a diagram illustrating the overview and inner structure of a radiation detector 1B in accordance with the second embodiment. The radiation detector 1B in accordance with this embodiment comprises a scintillator 2B having a plurality of light-scattering surfaces 22, first and second photodetectors 12, 14, and a reflector 19. The radiation detector 1B in accordance with this embodiment differs from the radiation detector 1A in accordance with the first embodiment in that it has the light-scattering surfaces 22 different from the light-scattering surfaces 21 in accordance with the first embodiment. The structures and arrangements of the first and second photodetectors 12, 14 and reflector 19 are the same as those in the radiation detector 1A in accordance with the first embodiment mentioned above and thus will not be explained in detail.

A plurality of light-scattering surfaces 22 are formed within the crystal mass 10B of the scintillator 2B. Each light-scattering surface 22 includes a modified region 22R (first area) and an unmodified region 22N (second area) not formed with the modified region 22R. The modified region 22R is favorably formed by irradiating the inside of the crystal mass 10B with laser light. The unmodified region 22N is surrounded by the modified region 22R.

The radiation detector 1B having the scintillator 2B formed with a plurality of light-scattering surfaces 22 as in this embodiment can also favorably attain the effects of the radiation detector 1A in accordance with the first embodiment mentioned above. Even when the light-scattering surfaces 22 include an area which is so distant from a side face 15 which is a laser entrance surface of the scintillator 2B as to be hard to form the modified region 22R, this embodiment makes it unnecessary to form the modified region 22R there. Hence, a plurality of light-scattering surfaces 22 can be formed favorably. It is not necessary to form the modified region 22R all over the light-scattering surface. This can cut down the processing time for forming the light-scattering surfaces 22.

Figure 6:
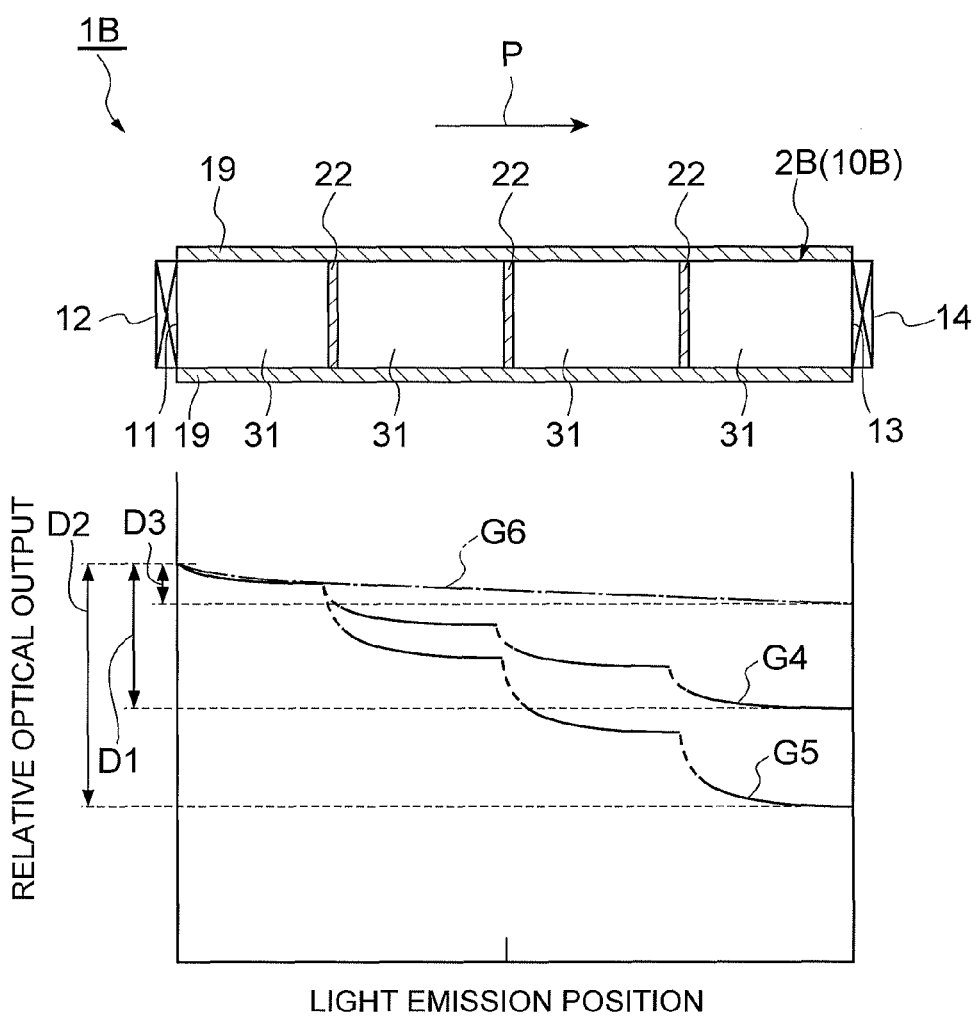
FIG. 6 is a diagram for explaining effects of the radiation detector in accordance with the second embodiment.

Operations and effects of the radiation detector 1B in accordance with this embodiment will now be explained with reference to FIG. 6. FIG. 6 illustrates the relationship between the scintillation light emission position in the scintillator 2B and the optical output detected by the first photodetector 12. Graph G4 illustrates the relationship between the scintillation light emission position in the scintillator 2B and the optical output. Graph G5 illustrates the relationship between the scintillation light emission position in the scintillator 2A in accordance with first embodiment and the optical output detected by the first photodetector 12. For comparison, graph G6 illustrates the relationship between the scintillation light emission position in a scintillator having no light-scattering surface and the optical output detected by the first photodetector 12.

How much scintillation light is scattered when passing through a light-scattering surface seems to basically depend on the area of a modified region in the light-scattering surface. Hence, as graph G5 illustrates, the scintillator 2A having the light-scattering surface 21 formed with the modified region 21R all over yields the largest optical output difference D2, which is the difference between the optical output generated in a region closer to the first photodetector 12 as detected thereby and the optical output generated in a region farther from the first photodetector 12 as detected thereby.

As graph G6 illustrates, on the other hand, the scintillator having no light-scattering surface yields the smallest optical output difference D3. The area of the modified region 22R of the light-scattering surface 22 in accordance with this embodiment can be set to a given value. Therefore, the scintillator 2B having the light-scattering surfaces 22 in accordance with this embodiment can set the optical output difference D1 to a value between the optical pressure differences D2 and D3. Hence, the radiation detector 1B in accordance with this embodiment can freely control the quantities of light reaching the first and second photodetectors 12, 14, so that the light emission region can be specified more accurately according to the ratio between the respective optical outputs detected by the first and second photodetectors 12, 14, whereby the radiation detector 1B can achieve a favorable position detection characteristic.

Various modified examples of the radiation detector 1B in accordance with the second embodiment mentioned above will now be explained. In the light-scattering surface 22 of the second embodiment, the unmodified region 22N is surrounded by the modified region 22R. The forms and arrangements of the modified region 22R and unmodified region 22N can be modified in various ways without being restricted to the above.

Modified Example 1

Figure 7:
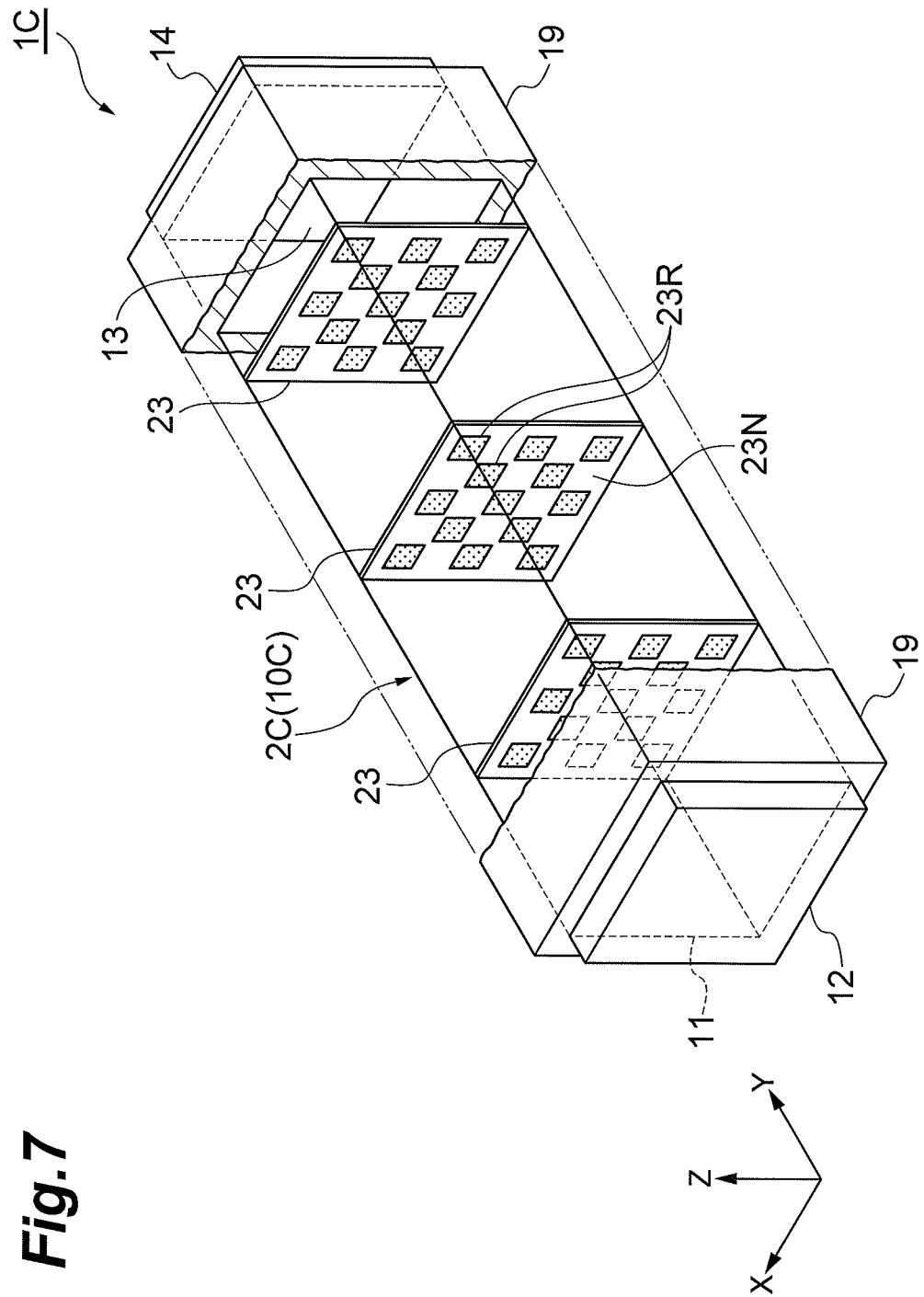
FIG. 7 is a perspective view illustrating the overview and inner structure of the radiation detector in accordance with Modified Example 1.

FIG. 7 is a diagram illustrating the overview and inner structure of a radiation detector 1C in accordance with Modified Example 1. The radiation detector 1C in accordance with this modified example comprises a scintillator 2C having a plurality of light-scattering surfaces 23, first and second photodetectors 12, 14, and a reflector 19. The radiation detector 1C in accordance with this modified example differs from the radiation detector 1B in accordance with the second embodiment in that it has the light-scattering surfaces 23 different from the light-scattering surfaces 22 in accordance with the second embodiment. The structures and arrangements of the first and second photodetectors 12, 14 and reflector 19 are the same as those in the radiation detector 1B in accordance with the second embodiment mentioned above and thus will not be explained in detail.

A plurality of light-scattering surfaces 23 are formed within the crystal mass 10C of the scintillator 2C. Each light-scattering surface 23 includes a plurality of modified regions 23R (a plurality of third areas) and a plurality of unmodified regions 23N (a plurality of fourth areas) not formed with the modified regions 23R. The plurality of modified regions 23R are favorably formed by irradiating the inside of the crystal mass 10C with laser light. The modified regions 23R and unmodified regions 23N are arranged in a checkerboard pattern.

The radiation detector 1C having the scintillator 2C formed with a plurality of light-scattering surfaces 23 as in this embodiment can also favorably attain the effects of the radiation detector 1B in accordance with the second embodiment mentioned above.

Modified Example 2

Figure 8:
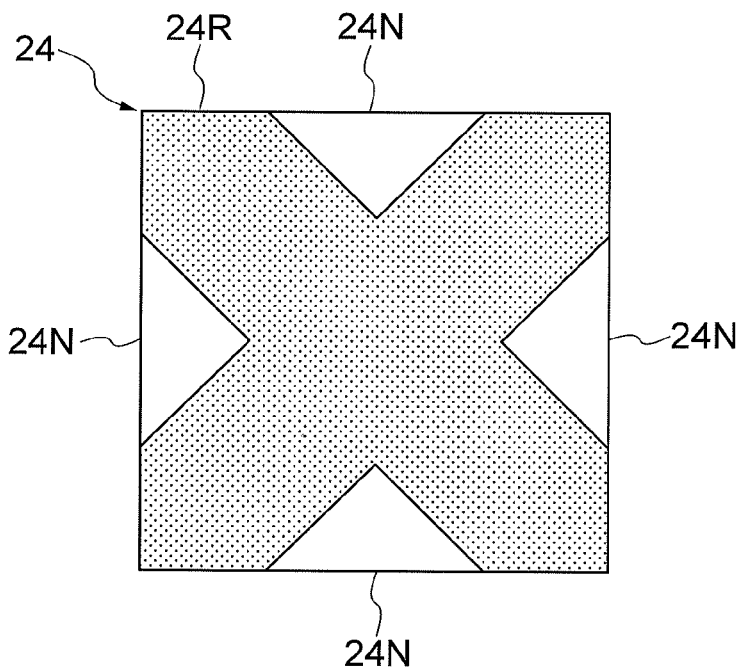
Figure 8:
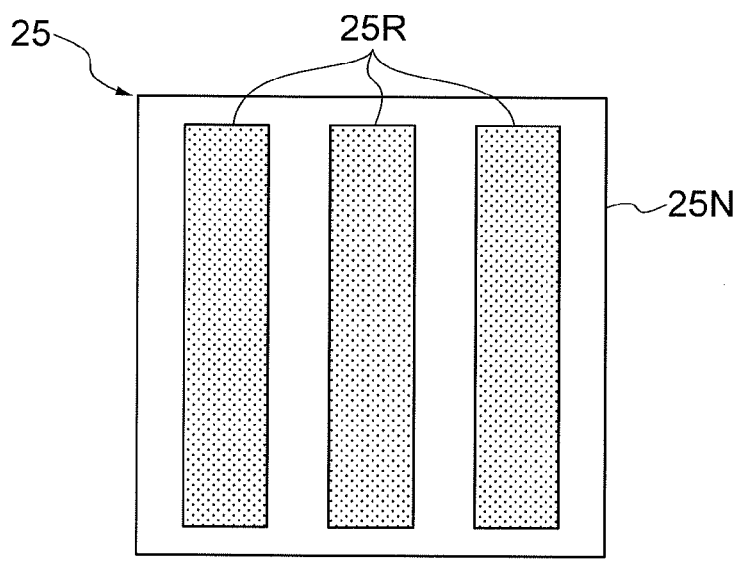

FIG. 8(a) is a diagram illustrating the structure of a light-scattering surface 24 of a radiation detector in accordance with Modified Example 2 of the radiation detector 1B in accordance with the second embodiment mentioned above. Its first end face 11 (see FIG. 5) is quadrangular. It has a modified region 24R constituted by a modified region extending along one diagonal in the first end face 11 and a modified region extending along the other diagonal in the first end face. The radiation detector provided with the light-scattering surface 24 having the modified region 24R as in this modified example can also favorably attain the effects of the invention in accordance with the second embodiment mentioned above.

Modified Example 3

FIG. 8(b) is a diagram illustrating the structure of a light-scattering surface 25 of a radiation detector in accordance with Modified Example 3 of the second embodiment mentioned above. The light-scattering surface 25 has a plurality of modified regions 25R, each extending in a predetermined direction (second direction) within the plane of the light-scattering surface 25, arranged with intervals therebetween along a direction substantially orthogonal to the predetermined direction. The modified regions 25R are discretely surrounded by an unmodified region 25N not formed with the modified regions 25R. The radiation detector provided with the light-scattering surface 25 having the modified regions 25R as in this modified example can also favorably attain the effects of the invention in accordance with the second embodiment mentioned above.

Modified Example 4

Figure 9:
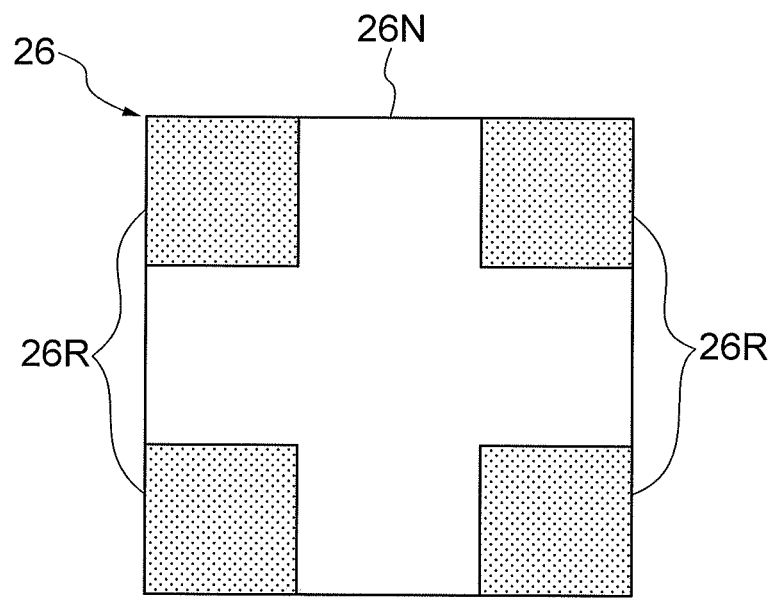
Figure 9:
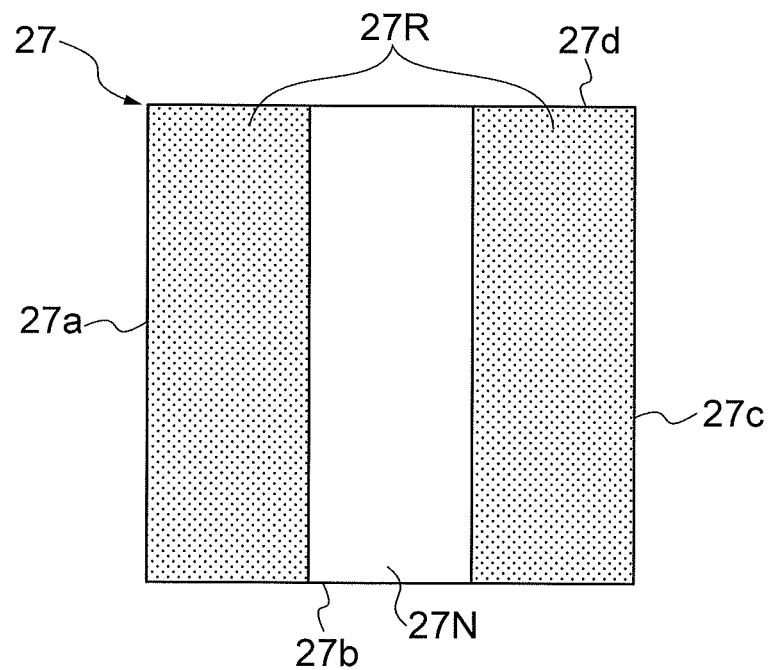

FIG. 9(a) is a diagram illustrating the structure of a light-scattering surface 26 of a radiation detector in accordance with Modified Example 4 of the second embodiment mentioned above. Its first end face 11 (see FIG. 5) is quadrangular. The light-scattering surface 26 has four modified regions 26R, which are arranged at four corners of the light-scattering surface 26, respectively. Each of the four modified regions 26R has a substantially square form, for example. An unmodified region 26N not formed with the modified regions 26R has a substantially cross form. The radiation detector provided with the light-scattering surface 26 having the modified regions 26R as in this modified example can also favorably attain the effects of the invention in accordance with the third embodiment mentioned above.

Modified Example 5

FIG. 9(b) is a diagram illustrating the structure of a light-scattering surface 27 of a radiation detector in accordance with Modified Example 5 of the second embodiment mentioned above. The light-scattering surface 27 has a modified region 27R extending in a direction along a part or whole of an edge part of the light-scattering surface 27. The modified region 27R may be formed at one edge part 27a in four edge parts 27a to 27d of the light-scattering surface 27 having a quadrangular form and another edge part 27c on the side opposite from the one edge part 27a. In this modified example, the modified region 27R and an unmodified region 27N not formed with the modified region are arranged in stripes. The radiation detector provided with the light-scattering surface 27 having the modified regions 27R as in this modified example can also favorably attain the effects of the invention in accordance with the second embodiment mentioned above.

Example 1

Figure 10:
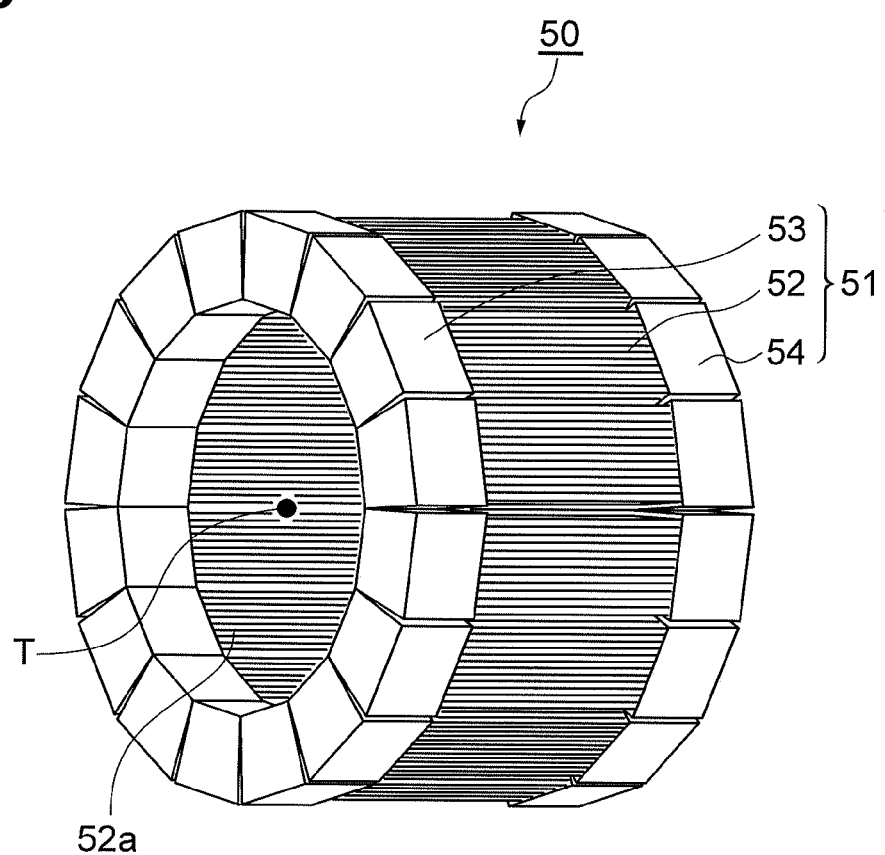
FIG. 10 is a perspective view illustrating the structure of a radiation detector unit in accordance with Example 1.

Example 1 using the above-mentioned radiation detector 1A will now be explained. FIG. 10 is a perspective view illustrating the structure of a radiation detector unit 50 constituting a part of a PET device. This radiation detector unit 50 comprises a plurality of radiation detector arrays 51. Each radiation detector array 51 comprises a scintillator array 52, a first photodetector array 53, and a second photodetector array 54. First and second photodetectors 12, 14 constituting the first and second photodetector arrays 53, 54 are optically coupled to the first and second end faces 11, 13 of the scintillator 2A (see FIG. 1) constituting the scintillator array 52, respectively, so as to construct the radiation detector 1A in accordance with the first embodiment.

The plurality of radiation detector arrays 51 are arranged along the circumference of a circle centered at an object to be measured T. Each radiation detector array 51 is arranged such that a side face 52a of the scintillator array 52 opposes the object T. In thus constructed radiation detector unit 50, a set of radiation detector arrays 51 for performing coincidence counting is constituted by one radiation detector array 51 and a plurality of radiation detector arrays 51 located on the side opposite from the former radiation detector array 51.

Example 2

Figure 11:
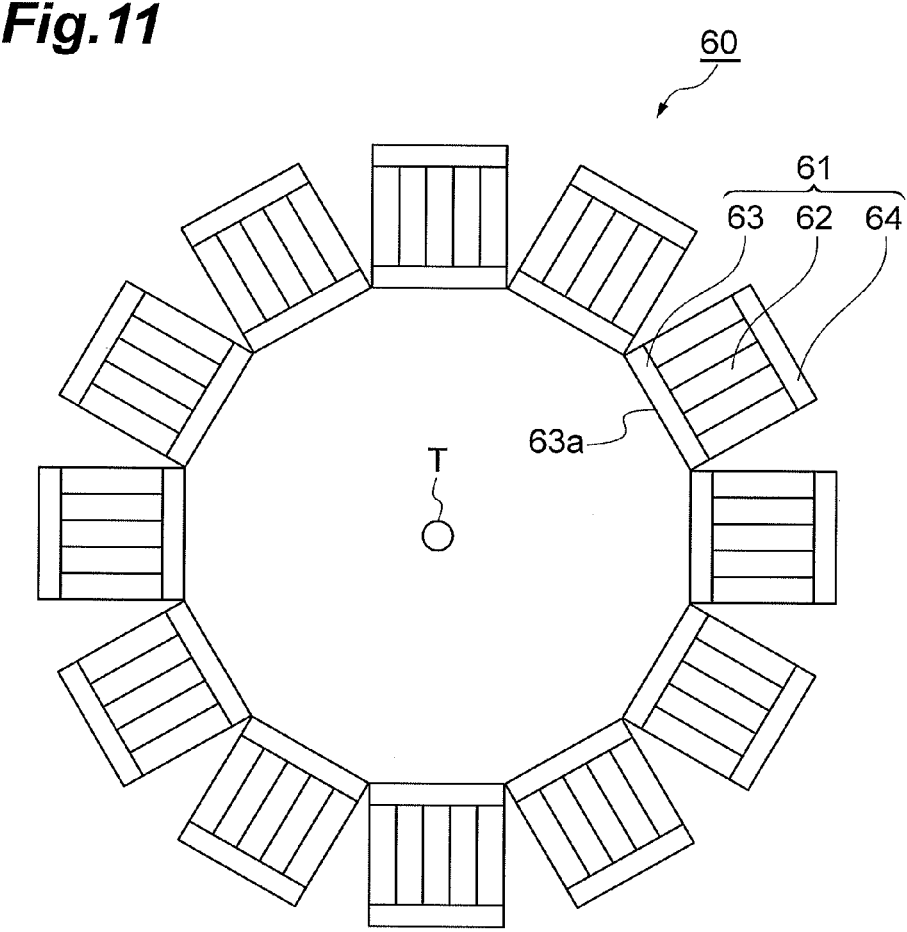
FIG. 11 is a perspective view illustrating the structure of a radiation detector unit in accordance with Example 2.
Figure 12:
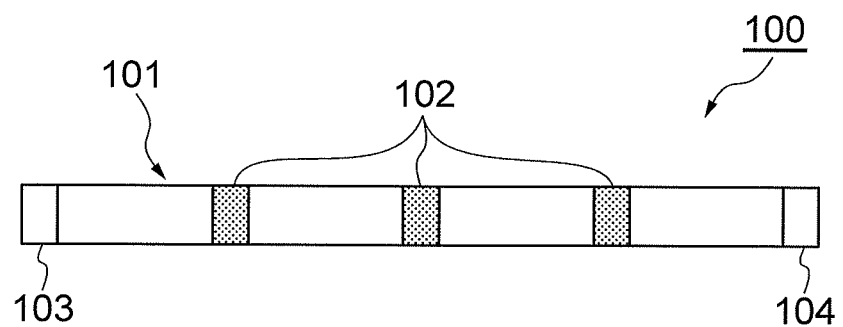
FIG. 12 is a side view illustrating the structure of a conventional radiation detector.
Figure 13:
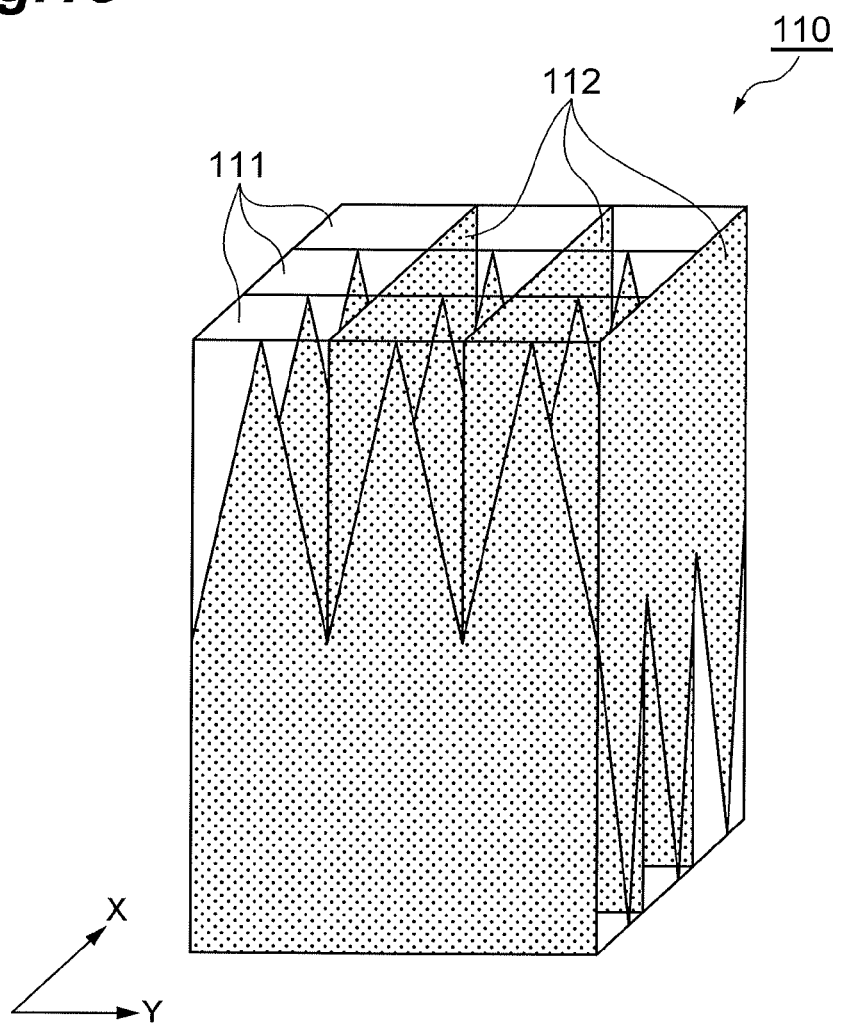
FIG. 13 is a side view illustrating the structure of a conventional scintillator.
Figure 14:
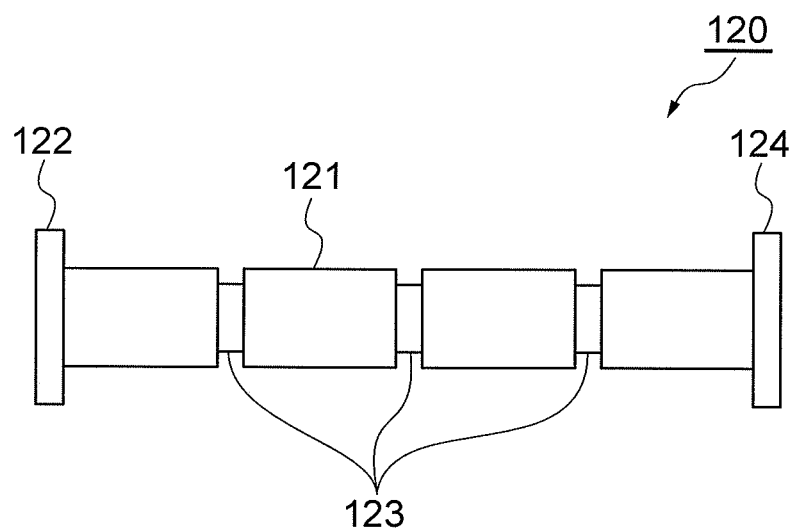
FIG. 14 is a side view illustrating the structure of another conventional radiation detector.

Example 2 using the above-mentioned radiation detector 1A will now be explained. FIG. 11 is a perspective view illustrating the structure of a radiation detector unit 60 constituting a part of a PET device. This radiation detector unit 60 comprises a plurality of radiation detector arrays 61. Each radiation detector array 61 comprises a scintillator array 62, a first photodetector array 63, and a second photodetector array 64. First and second photodetectors 12, 14 constituting the first and second photodetector arrays 63, 64 are optically coupled to the first and second end faces 11, 13 of the scintillator 2A (see FIG. 1) constituting the scintillator array 62, respectively, so as to construct the radiation detector 1A in accordance with the first embodiment.

The plurality of radiation detector arrays 61 are arranged along the circumference of a circle centered at an object to be measured T. Each radiation detector array 61 is arranged such that the rear face 63a of the first photodetector array 63 opposes the object T. In thus constructed radiation detector unit 60, a set of radiation detector arrays 61 for performing coincidence counting is constituted by one radiation detector array 61 and a plurality of radiation detector arrays 61 located on the side opposite from the former radiation detector array 61.

INDUSTRIAL APPLICABILITY

The radiation detector in accordance with the present invention can achieve a favorable position detection characteristic while being easy to manufacture.

REFERENCE SIGNS LIST 1A to 1C, 100, 120 . . . radiation detector; 2A to 2C, 101, 110, 121 . . . scintillator; 10A to 10C . . . crystal mass; 11 . . . first end face; 12 . . . first photodetector; 13 . . . second end face; 14 . . . second photodetector; 15 . . . side face; 19 . . . reflector; 21 to 27 . . . light-scattering surface; 31 . . . light emission region; 21R to 27R . . . modified region; 21N to 27N . . . unmodified region; 50, 60 . . . radiation detector unit; 52, 62 . . . scintillator array; 53, 63 . . . first photodetector array; 54, 64 . . . second photodetector array; 103, 104, 122, 124 . . . photodetector, 200 . . . laser processing device; 201 . . . laser light source; 202 . . . laser light source controller; 203 . . . shutter; 204 . . . dichroic mirror; 205 . . . condenser lens; 207 . . . mount table; 209 . . . X-axis stage; 211 . . . Y-axis stage; 213 . . . Z-axis stage; 215 . . . stage controller; 217 . . . observation light source; 219 . . . beam splitter; 221 . . . CCD camera; 223 . . . imaging lens; 225 . . . imaging data processor; 227 . . . overall controller; 229 . . . monitor; D . . . converging point; P . . . first direction

The invention claimed is:

1. A radiation detector for detecting a radiation, the radiation detector comprising:
a scintillator having a first end face, a second end face disposed on a side opposite from the first end face, and a plurality of light-scattering surfaces formed with an interval therebetween along a first direction from the first end face side to the second end face side;
a first photodetector optically coupled to the first end face; and
a second photodetector optically coupled to the second end face;
wherein the light-scattering surfaces are formed so as to intersect the first direction; and
wherein the light-scattering surfaces include one or a plurality of modified regions formed by irradiating the inside of the scintillator with laser light.

2. A radiation detector according to claim 1, wherein the modified region is constituted by a plurality of modified spots overlapping each other.

3. A radiation detector according to claim 1 or 2, wherein the light-scattering surface is constructed by forming the modified region all over.

4. A radiation detector according to claim 1 or 2, wherein the light-scattering surface has a first area formed with the modified region and a second area not formed with the modified region, the second area being surrounded by the first area.

5. A radiation detector according to claim 1 or 2, wherein the light-scattering surface has a plurality of third areas formed with the modified region and a plurality of fourth areas not formed with the modified region, the third and fourth areas being arranged in a checkerboard pattern.

6. A radiation detector according to claim 1 or 2, wherein the first end face has a quadrangular form, and wherein the light-scattering surface has a first modified region extending along one diagonal in the first end face and a second modified region extending along the other diagonal in the first end face.

7. A radiation detector according to claim 1 or 2, wherein the light-scattering surface has the plurality of modified regions extending in a second direction, and the plurality of modified regions are arranged with an interval therebetween along a direction substantially orthogonal to the second direction.

8. A radiation detector according to claim 1 or 2, wherein the first end face has a quadrangular form, wherein the light-scattering surface has four modified regions, and the modified regions are arranged at each of four corners of the light-scattering surface.

9. A radiation detector according to claim 1 or 2, wherein the light-scattering surface has a modified region extending in a direction along a part or whole of an edge part of the light-scattering surface.

\* \* \* \* \*